Patented Nov. 4, 1930

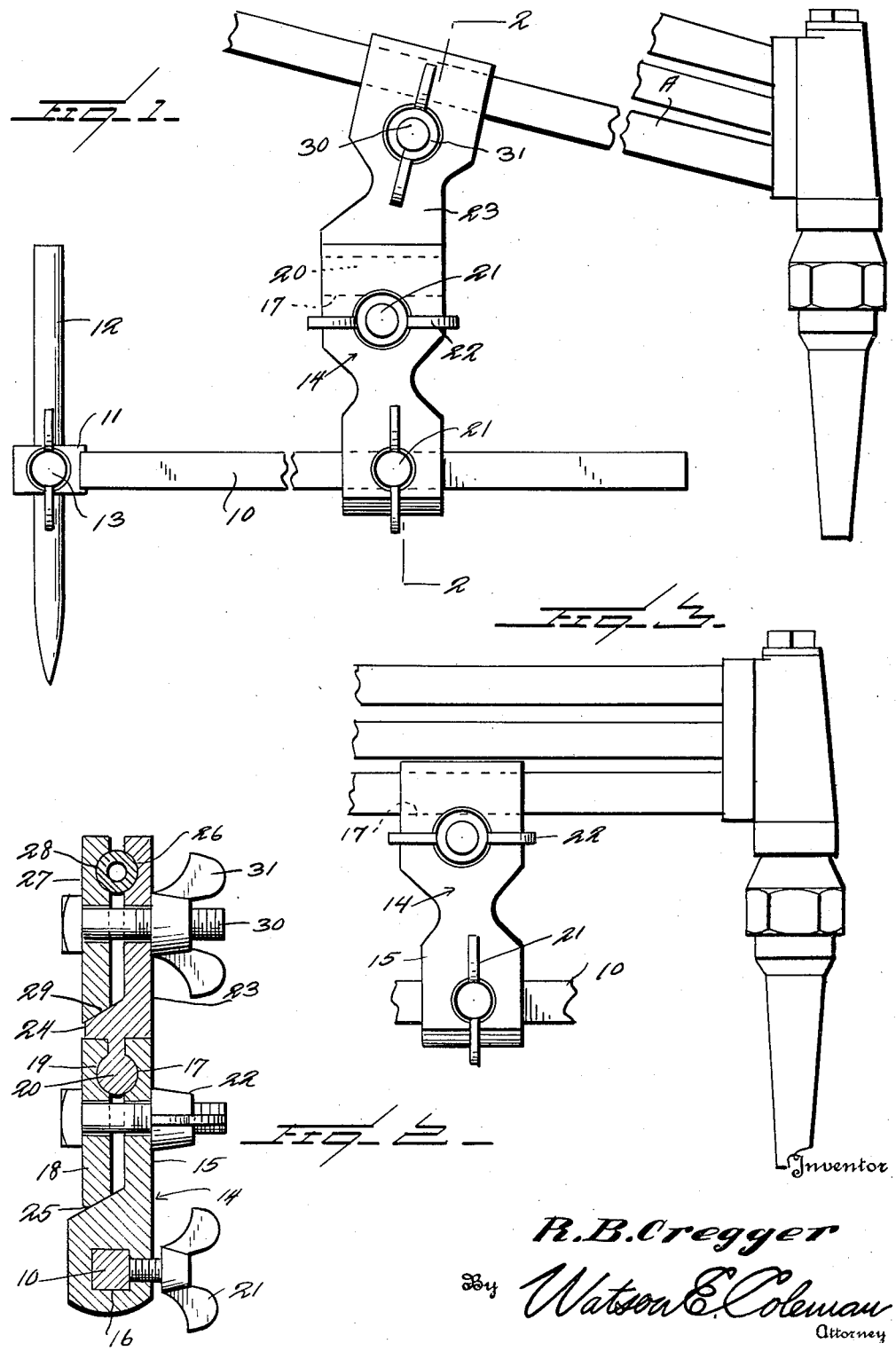

1,780,814

UNITED STATES PATENT OFFICE

ROE B. CREGGER, OF RICHMOND, VIRGINIA

BLOWTORCH SUPPORT AND SCRIBER

Application filed September 19, 1929. Serial No. 393,769.

This invention relates to means for supporting acetylene blow torches while cutting a circular hole through metal and the general object of the invention is to provide a support of this kind which will permit a circle to be inscribed by the torch of definite radius and on a regular curve and doing away with the necessity of marking or inscribing a circle upon the metal to be cut and the operator attempting to follow the scribed circle by eye.

A further object of the invention is to provide a support of this character which will permit the use of torches for cutting the circle where the tip of the torch is disposed either at right angles to the body of the torch or at a sixty degree angle thereto, thus permitting either form of torch to be used and yet directing the flame directly downward on to the cut.

A further object is to provide a device of this character which will permit the torch to be used with the torch extended in either direction for the cutting of small circles or large circles and to provide a support which is very simple, which may be cheaply made, and which has been found to be thoroughly effective in actual practice.

Other objects will appear in the course of the following description.

My invention is illustrated in the accompanying drawings, wherein:—

Figure 1 is a side elevation of a blow torch holder and a scriber constructed in accordance with my invention;

Figure 2 is a section on the line 2—2 of Figure 1;

Figure 3 is a fragmentary elevation showing the application of the holder to a modified form of torch.

Referring to these drawings, 10 designates a shank of metal which is preferably formed of a metallic rod rectangular in cross section and provided at one end with the eye 11 through which the pivot pin 12 passes, this pivot pin being held in place by the set screw 13 and being readily adjustable upward or downward through the eye. This pivot pin constitutes the center upon which the radius rod 10 swings.

Slidingly mounted upon the rod 10 is a clamp designated 14. This clamp comprises the element 15 which at its lower end is relatively wide and formed with a longitudinally extending passage 16 fitting the rectangular shank 10 and sliding thereon. This element 15 extends upward and upon the inner face of the upper end is formed with a semi-circular groove 17.

Confronting the element 15 is the element 18 which is in the form of a plate having a width and shape corresponding to the width and shape of the element 15.

This plate on its inside face adjacent its upper end is formed with a groove 19 complementary to the groove 17. The lower end face of the member 18 is beveled at 20 to fit against the beveled upper face of the enlarged lower portion of the element 15. A binding bolt 21 passes through the elements 15 and 18 just below the grooves 17 and 19, this bolt carrying upon it the wing nut 22. Thus it will be seen that the element 18 may be drawn toward the element 15 and have binding engagement against the shank of a torch A whose tip is at right angles to the shank.

It will be seen that the passage formed by the complementary grooves 17 and 19 is parallel to the radius rod 10 so that a torch gripped between these clamping elements 15 and 18 will have its tip extended downward at right angles to the face of the plate.

Many torches are made with a tip disposed at an angle of sixty degrees to the shank of the torch instead of an angle of ninety degrees and I have made provision for the use of these torches by providing a second clamping member adapted to be clamped upon the first named clamping member 15 but disposed in angular relation thereto. The second clamping member comprises the clamping element 23 which is thickened at its lower end as at 24 to form a base, this base carrying the downwardly extending bead 24 connected to the base by the shallow neck 26. This bead is adapted to be disposed within the grooves 17 and 19 and be clamped between the members 15 and 18. The member 23 is formed on its inside face and adjacent its upper edge with the semi-circular groove 26 and confronting the inner face of the member 23 is the clamping element 27 which at its upper end is formed with a complementary groove 28 confronting the groove 26.

This member 28 is the same width in contour as the member 23 but has its lower edge beveled at 29 to fit against the beveled face of the widened portion of the member 23. A binding bolt 30 passes through apertures in the elements 27 and 23 and carries the wing nut 31. It will be seen from Figure 1 that while the lower edge faces of the base 24 are adapted to fit upon the upper edge faces of the elements 15 and 18 and are parallel to the radius rod 10, the body of this upper clamp extends at a slight angle to the vertical axis of the lower clamp so that the grooves 26 and 28 define a passage extending at an angle to the radius rod 10 instead of being parallel thereto. By this means, a blow torch having its tip disposed at an angle of sixty degrees to the shank of the torch may be mounted within this upper clamp and the flame will be directed downward with its axis at right angles to the face of the plate which is being cut.

Where a small circle is to be inscribed and cut the lower clamp or the conjoined upper and lower clamps may be shifted along the rod 10 nearer to or further from the pin 12 and the torch inserted so as to extend over and beyond the pin 12 and the flame directed downward against the metal. Where a large circle is to be inscribed and cut by the blow pipe flame, the torch is to be inserted in the clamp or clamps in a direction away from the pivot pin 12 and the flame will then be directed downward exterior to the butt end of the radius rod 10.

It will be seen that this device provides a very simple and convenient means for holding an acetylene gas torch while the clamps supporting the torch are being rotated around a fixed center to thus inscribe an exact circle with any desired radius around this center.

The torches are readily inserted and readily removed and the clamps are adapted to be engaged with torches of various forms. Of course, I do not wish to be limited to the exact angles for the clamping grooves of the clamps as these may be varied. Neither do I wish to be limited to the exact details of construction.

I claim:—

1. A blow torch support of the character described comprising a radius rod, a pivot pin carried at one end of the radius rod, a lower clamping member slidably mounted upon the radius rod and having means whereby it may be held in adjusted positions thereon and comprising two elements, the confronting faces of which are formed with confronting grooves within which a blow torch may be disposed, means for forcing said elements toward each other to clamp the torch therein, a second clamp adapted to be superposed upon the first named clamp and comprising two elements, one of said elements being formed with a bead insertible into the grooves of the first named clamp, the second named clamp having confronting elements formed with confronting torch receiving grooves, and means for forcing said elements toward each other.

2. A blow torch support of the character described comprising a radius rod, a pivot pin carried at one end of the radius rod, a lower clamping member slidably mounted upon the radius rod and having means whereby it may be held in adjusted positions thereon and comprising two elements, the confronting faces of which are formed with confronting grooves within which a blow torch may be disposed, means for forcing said elements toward each other to clamp the torch therein, a second clamp adapted to be superposed upon the first named clamp and comprising two elements, one of said elements being formed with a bead insertible into the grooves of the first named clamp, the second named clamp having confronting elements formed with confronting torch receiving grooves, and means for forcing said elements toward each other, the grooves of the second named clamp being disposed at an acute angle to the grooves of the first named clamp, the grooves of the first named clamp being disposed approximately parallel to the radius rod whereby to permit torches having tips disposed in different angular relations to the shank to be mounted within one or the other of the clamps to discharge the flame directly downward at right angles to the length of the radius rod.

3. A blow torch support of the character described, comprising a radius rod having a pivot pin in one end, a lower clamping member slidingly mounted upon the radius rod and having means whereby it may be held in adjusted position thereon and formed to engage and clamp on a blow torch, a second clamping member formed for detachable engagement upon the first named clamping member and when so engaged, being angularly disposed relative thereto, and the second named clamping member being formed to clamp upon a blow torch.

In testimony whereof I hereunto affix my signature.

ROE B. CREGGER.